United States Patent
Kong et al.

(10) Patent No.: US 11,601,061 B2
(45) Date of Patent: Mar. 7, 2023

(54) SYSTEM FOR TURNING OFF A SYNCHRONOUS RECTIFIER BASED ON A PRIMARY SWITCH TURN-ON DETECTION

(71) Applicant: DIALOG SEMICONDUCTOR INC., Campbell, CA (US)

(72) Inventors: Pengju Kong, Campbell, CA (US); Qingqing Zong, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 16/784,108

(22) Filed: Feb. 6, 2020

(65) Prior Publication Data
US 2021/0249964 A1    Aug. 12, 2021

(51) Int. Cl.
H02M 3/335    (2006.01)
H02M 1/00     (2006.01)

(52) U.S. Cl.
CPC ...... *H02M 3/33592* (2013.01); *H02M 1/0038* (2021.05)

(58) Field of Classification Search
CPC ....... H02M 1/0038; H02M 2001/0038; H02M 3/33576; H02M 3/33592
See application file for complete search history.

(56) References Cited

U.S. PATENT DOCUMENTS

| | | | |
|---|---|---|---|
| 10,615,700 B1* | 4/2020 | Moon | H02M 1/38 |
| 2009/0257250 A1* | 10/2009 | Liu | H02M 3/33592 363/21.06 |
| 2009/0316441 A1* | 12/2009 | Hu | H02M 3/33592 363/21.06 |
| 2014/0003097 A1* | 1/2014 | Sakurai | H02M 3/33507 363/21.14 |
| 2014/0112031 A1* | 4/2014 | Chen | H02M 3/33523 363/21.14 |
| 2017/0222568 A1* | 8/2017 | Choi | H02M 3/33592 |
| 2017/0244333 A1* | 8/2017 | Choi | H02M 3/33592 |
| 2017/0317598 A1* | 11/2017 | Ptacek | H02M 1/08 |
| 2018/0301999 A1* | 10/2018 | Moon | H02M 3/33523 |
| 2020/0076291 A1* | 3/2020 | Phadke | H02M 1/08 |
| 2020/0169179 A1* | 5/2020 | Hara | H02M 1/38 |

(Continued)

*Primary Examiner* — Fred E Finch, III
(74) *Attorney, Agent, or Firm* — Haynes & Boone, LLP

(57) ABSTRACT

A system for turning off a synchronous rectifier (SR) based on a primary switch (PS) turn-on detection in a flyback converter having a primary-side and a secondary-side is disclosed. The system comprises the PS on the primary-side, the SR on the secondary-side, a spike detector, and a SR controller. The SR is configured to produce a drain-to-source voltage ($V_{DS}$). The spike detector is in signal communication with an output capacitor ($C_{out}$) on the secondary-side and the spike detector is configured to detect a voltage spike of an output voltage ($V_{Out}$) across the $C_{out}$ that is indicative of the PS being turned-on. The SR controller is in signal communication with the SR and the spike detector and the SR controller is configured to turn-off the SR based on the spike detector detecting the voltage spike of the $V_{Out}$.

17 Claims, 10 Drawing Sheets

(56) References Cited

U.S. PATENT DOCUMENTS

| | | | |
|---|---|---|---|
| 2021/0091654 A1* | 3/2021 | Rajesh | H02M 1/08 |
| 2021/0175817 A1* | 6/2021 | Miao | H02M 1/08 |
| 2021/0226540 A1* | 7/2021 | Zhao | H02M 3/33592 |

* cited by examiner

SYSTEM FOR TURNING OFF A SYNCHRONOUS RECTIFIER BASED ON A PRIMARY SWITCH TURN-ON DETECTION

TECHNICAL FIELD

This application relates to synchronous rectification in a switching power converter, and more particularly to synchronous rectifier switch control during critical continuous operation.

BACKGROUND

Isolated converters such as flyback converters are commonly used in modern power supplies and utilized in both alternating current (AC) to direct current (DC) and DC to DC conversion with galvanic isolation between the input and any outputs of a power supply. In general, a flyback converter with synchronous rectification has a primary-side and secondary-side, where the primary-side of the flyback converter includes a primary-side power switch transistor (generally known as a "PS" transistor) and the secondary-side includes a synchronous rectifier transistor (generally known as an "SR" transistor).

A controller regulates the switching of the PS transistor over successive power cycles to regulate the output voltage ($V_{Out}$) of the flyback converter. The PS transistor is in series with a primary winding of a transformer so that when the PS transistor is switched on, a primary current builds up magnetic energy in the transformer. An example flyback converter 100 is shown in FIG. 1. The flyback converter 100 includes a transformer 102 that divides the flyback converter 100 into a primary-side circuit 104 and secondary-side circuit 106. The transformer 102 also includes a transformer core 108 and primary-winding 110 and secondary-winding 112. In this example, the transformer 102 is modeled as including the transformer core 108, the primary-winding 110, secondary-winding 112, a magnetizing inductance ($L_M$), a primary-side leakage inductance ($L_{lk-p}$), and a secondary-side leakage inductance ($L_{lk-s}$). The primary-side circuit 104 includes a PS transistor, a primary-side controller (PSC) 114, and a sensing resistor ($R_{Sense}$) between a source of the PS transistor and a primary-side ground ($GND_P$). The secondary-side circuit 106 includes an SR transistor, an output capacitor ($C_{out}$), and an SR controller (SRC) 116.

During continuous conduction mode (CCM) operation, there is no dead time between a cycling off of the SR transistor and a cycling on of the PS transistor. A secondary-winding current ($I_{SEC}$) may thus still be conducting while a primary-winding current ($I_{PRI}$) begins conducting. This simultaneous on-time for the SR and PS transistors is undesirable as it wastes power and can damage flyback converter 100. This problem may be better appreciated with reference to FIGS. 2A-2E, which illustrate operating waveforms of flyback converter 100 during CCM operation. FIG. 2A illustrates the primary-winding current $I_{PRI}$ waveform. FIG. 2B illustrates the secondary-winding current $I_{SEC}$ waveform. Waveforms for an on-state $S_{PRI}$ for the PS transistor and an on-state $S_{SEC}$ for the SR transistor are shown in FIG. 2C and FIG. 2D, respectively. A drain-to-source voltage $V_{DS}$ waveform for the SR transistor is shown in FIG. 2E.

To detect the switching on of the PS transistor so that the SR transistor may be switched off, it is conventional to determine when the $V_{DS}$ voltage crosses a turn-off threshold voltage. But note that the drain-to-source resistance $R_{dson}$ while the SR transistor conducts is relatively small. The $V_{DS}$ voltage may thus not cross the turn-off threshold voltage until a relatively-large amount of secondary-winding current $I_{SEC}$ had begun conducting. In particular, it may be seen that during a simultaneous on-time 200 in a first switching cycle and a simultaneous on-time 202 in a second switching cycle, the primary-winding current $I_{PRI}$ increases quickly at a very high slew rate 204. Similarly, the secondary-winding current $I_{SEC}$ decreases quickly also at a very high slew rates 208. It can be shown that this increased slew rate 208 for the secondary-winding current $I_{SEC}$ is a function of the leakage inductances $L_{lk-p}$ and $L_{lk-s}$ being significantly smaller than the magnetizing inductance $L_M$. Unfortunately, the energy associated with this change in the secondary-winding current $I_{SEC}$ is not transferred to a load (not shown). This results in losses for the flyback converter 100. Furthermore, if the SR transistor turns OFF too late, the currents $I_{PRI}$ and/or $I_{SEC}$ may exceed the maximum rating of the components of the flyback converter 100, thereby causing damage.

There is thus a need in the art to determine an improved SR transistor switching timing for CCM operation.

SUMMARY

Disclosed is a system for turning off a synchronous rectifier (SR) transistor based on a primary transistor (PS) turn-on detection in a flyback converter having a primary-side and a secondary-side. The system comprises the PS transistor on the primary-side, the SR transistor on the secondary-side, a spike detector, and an SR controller. The spike detector is in signal communication with an output capacitor ($C_{out}$) on the secondary-side and is configured to detect a voltage spike of an output voltage ($V_{Out}$) across the output capacitor $C_{out}$ that is indicative of the PS transistor being turned-on. The SR controller is in signal communication with the SR transistor and the spike detector and is configured to turn-off the SR transistor based on the spike detector detecting the voltage spike of the output voltage $V_{Out}$.

In an example of operation, the system performs a method that comprises: measuring the output voltage $V_{Out}$ on the secondary-side of the flyback converter; detecting, with the spike detector, a voltage spike of the output voltage $V_{Out}$ that is indicative of the PS transistor being turned-on; and turning-off the SR transistor when the spike detector detects the voltage spike of the $V_{Out}$.

Also disclosed is another system for turning off the SR transistor based on the PS turn-on detection. The system comprises the PS transistor on the primary-side, the SR transistor on the secondary-side, a zero-voltage switching (ZVS) switch, the spike detector, and the SR controller. The ZVS switch is in signal communication with the transformer. The spike detector is in signal communication with the output capacitor and is configured to detect a voltage spike of the output $V_{Out}$ when the ZVS switch is turned-on. The SR controller is in signal communication with the SR transistor and the spike detector and is configured to turn-off the SR transistor based on the spike detector detecting the voltage spike of the $V_{Out}$.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
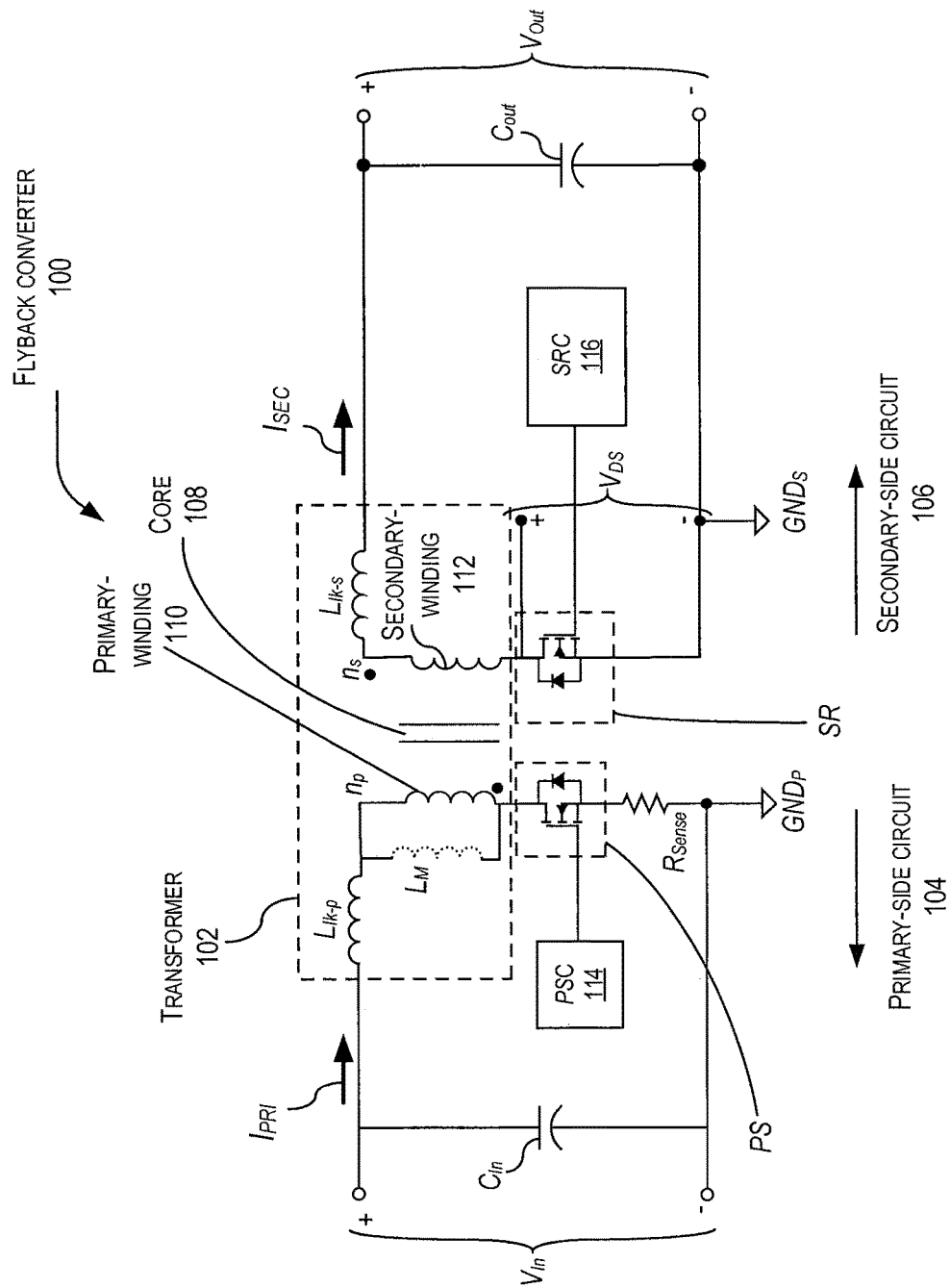
FIG. 1 is a schematic system diagram of a known flyback converter.

To address the need for reducing or eliminating the simultaneous on-time for the PS and SR transistors in a flyback converter during CCM operation, a secondary-side spike detector is introduced that detects voltage spikes in the output voltage $V_{Out}$. As compared to the conventional practice of monitoring the drain-to-source voltage of the SR transistor to determine when the drain-to-source voltage crosses a turn-off voltage threshold, the spike detector detects the primary switching event (the switching-on of the PS transistor) more quickly. An SR controller may thus switch off the SR transistor more quickly when triggered by the spike detector. This reduced delay in switching off the SR transistor reduces (or even eliminates) the simultaneous on-time of the SR and PS transistors. The resulting flyback converter thus provides increased efficiency and reduces the possibility of system damage due to excessive currents.

The spike detector takes advantage of the relatively-large equivalent series inductance (ESL) for the flyback converter's output capacitor. As discussed previously, the secondary-winding current $I_{SEC}$ changes at a relatively-high slew rate during the simultaneous on-time of the SR and PS transistors. This change in the secondary-winding current (which is also the output current of the flyback converter for charging the output capacitor with the output voltage) produces a voltage spike (sudden momentary increase) in the output voltage due to the current change across the ESL for the output capacitor. The spike detector detects the primary switching event by detecting the voltage spike so that the SR controller may switch off the SR transistor responsive to the primary switching event detection (through the detection of the voltage spike).

The combination of the spike detector and the SR controller may be deemed to form a system. However, it will be appreciated that the spike detector itself may be integrated with the SR controller in a single integrated circuit. To detect the voltage spike, the spike detector determines when the output voltage $V_{Out}$ exceeds a threshold voltage. In an example of operation, the system performs a method that comprises: comparing the output voltage to the threshold voltage, detecting a primary switching event responsive to a detection of the output voltage $V_{Out}$ exceeding the threshold voltage; and switching off the SR transistor responsive to the detection of the primary switching event.

It is not just the switching on of the PS transistor while the SR transistor is on that produces a voltage spike in the output voltage $V_{Out}$. For example, in a flyback converter with zero voltage switching (ZVS), it is conventional to switch on an active-clamp transistor (which is also denoted herein as a ZVS transistor) prior to the switching on of the PS transistor. As known in the ZVS arts, the switching on of the active-clamp transistor causes stored charge in an active-clamp capacitor to induce a negative current in the primary winding. This negative current discharges the drain voltage of the PS transistor to 0 V so that the PS transistor may then be cycled on with 0 V across its drain and source. The resulting ZVS of the PS transistor is quite advantageous in increasing efficiency and reducing strain on the PS transistor. But note that the switching on of the active-clamp transistor also produces a voltage spike in the output voltage $V_{Out}$. By detecting this active-clamp-caused voltage spike in the output voltage $V_{Out}$, the spike detector detects the upcoming primary switching event. The SR controller may thus respond to the ZVS switch detection by switching off the SR transistor prior to the switching on of the PS transistor. A ZVS embodiment with spike detection as disclosed herein may thus avoid any simultaneous on-time of the SR and PS transistors. A spike detection embodiment without ZVS will be discussed first followed by a discussion of a ZVS embodiment.

Figure 3A:
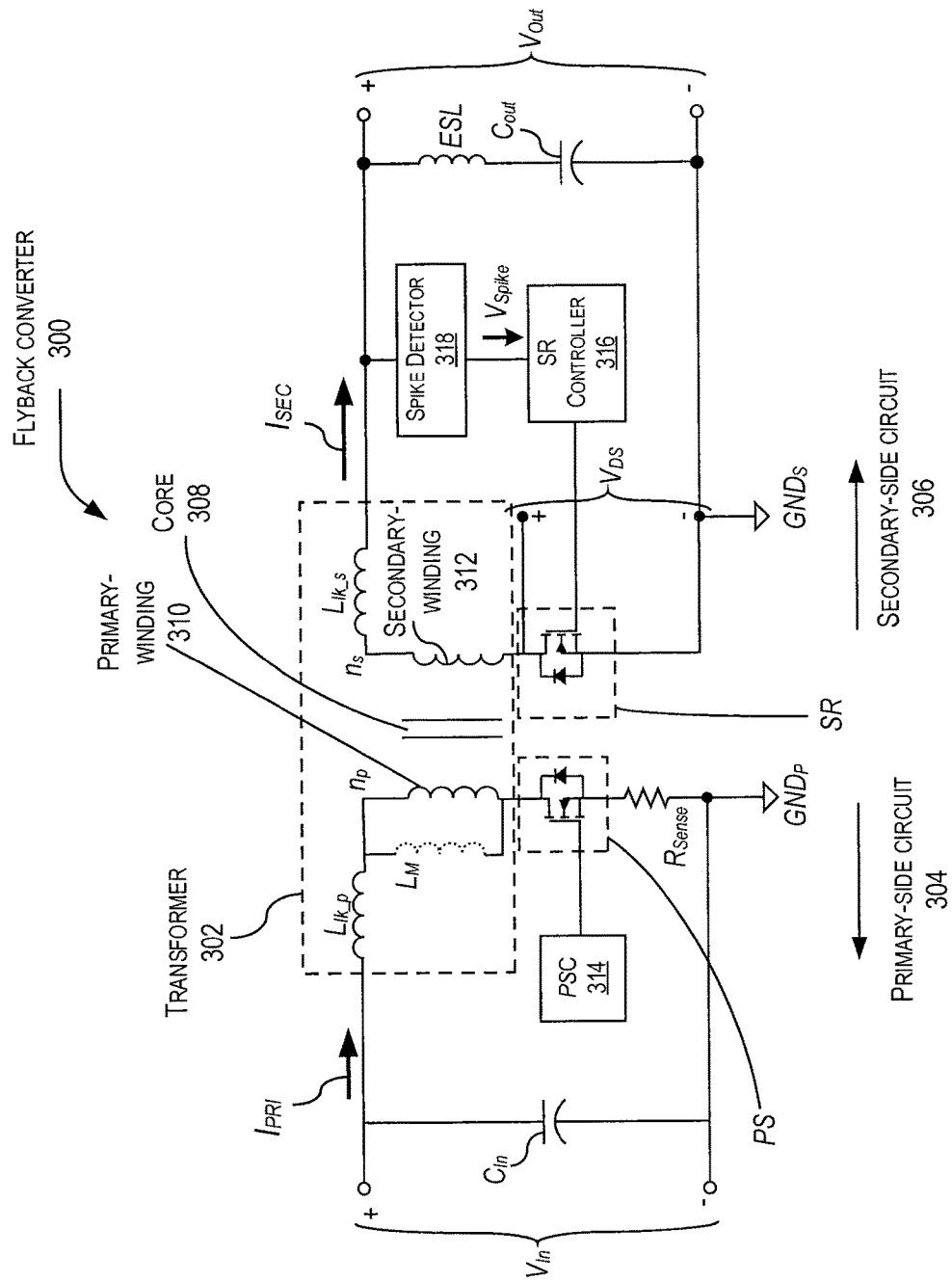
FIG. 3A is a schematic system diagram of an example of an implementation of a flyback converter in accordance with the present disclosure.

Turning to FIG. 3A, a schematic system diagram of an example of an implementation of a flyback converter 300 without ZVS switching is shown in accordance with the present disclosure. The flyback converter 300 includes a transformer 302 that divides the flyback converter 300 into a primary-side circuit 304 and secondary-side circuit 306. The transformer 302 also includes a transformer core 308 and primary-winding 310 and secondary-winding 312. In this example, the transformer 302 is modeled to include the transformer core 308, the primary-winding 310, the secondary-winding 312, a magnetizing inductance ($L_M$), a primary-side leakage inductance ($L_{lk-p}$), and a secondary-side leakage inductance ($L_{lk-s}$).

The primary-side circuit 304 includes a PS transistor, a primary-side controller (PSC) 314, an input capacitor ($C_{In}$), and a sensing resistor ($R_{Sense}$) between the source of the PS transistor and a primary-side ground ($GND_P$). The secondary-side circuit 306 includes an SR transistor, an output capacitor ($C_{out}$), an SR controller (SRC) 316, and a spike detector 318. The SR controller 316 is in signal communication with the gate of the SR transistor and also with the spike detector 318. The spike detector 318 is also in signal communication with the output capacitor $C_{Out}$ and the secondary-winding 312. In this example the output capacitor $C_{Out}$ has a relatively large built-in equivalent series inductance (ESL).

The primary-winding 310 is an electrical coil that has $n_p$ number of turns wrapped around a part of the core 308 on the primary-side circuit 304. Similarly, the secondary-winding 312 is an electrical coil that has $n_s$ number of turns wrapped around another part of the core 308 on the secondary-side circuit 306. The primary-winding 310 receives an increasing instantaneous current ($I_{PRI}$) when the PS transistor is in an ON-state and the secondary-winding 312 produces a secondary-current ($I_{SEC}$) when the SR transistor is in an ON-state. In this example, the PS and SR transistors are n-channel enhancement metal-oxide semiconductor field-effect (MOSFET) transistors. However, it will be appreciated that these transistors may be implemented in other forms such as bipolar junction transistors or PMOS transistors.

It is appreciated by those skilled in the art that the circuits, components, modules, and/or devices of, or associated with, the flyback converter 300 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the flyback converter 300 receives the input voltage $V_{In}$ and produces the output voltage $V_{Out}$. The flyback converter 100 switches between different states where the primary-side circuit 304 conducts power and then stops and the secondary-side circuit 306 also conducts power and stops. Specifically, the primary-side circuit 304 receives the input voltage $V_{In}$, across the input capacitor $C_{In}$. Initially, when the PS transistor is off (i.e., in an OFF-state), there is no primary-winding current $I_{PRI}$ and, therefore, no resulting voltage drop across the primary-winding 310 or the $L_M$ such that the drain of the MOSFET in the SR transistor is at a voltage equal to the input voltage $V_{In}$. When the primary-side controller PSC 314 produces a gate bias voltage and injects the gate bias voltage into the gate of the PS transistor, the MOSFET turns-on (i.e., changes to an ON-state) and current flows between the drain and source of the PS transistor and through the sense resistor $R_{Sense}$ and into the ground $GND_P$. This current is the primary-winding current $I_{PRI}$. As this current flows through the primary-winding 310, energy is transferred and stored in the transformer 302.

In this example, the energy is stored in the transformer 302 because the SR transistor is initially off (i.e., set initially to an OFF-state) so that no energy flows from the transformer 302 to the secondary-side circuit 306. In this situation, any power produced by the secondary-side circuit 306 is from the output voltage as stored in the output capacitor $C_{out}$.

Once the primary-side controller 314 stops charging the gate bias voltage of the PS transistor, the PS transistor turns off (i.e., is set to an OFF-state). When the secondary-side controller 316 turns on the SR transistor (i.e., is set to an ON-state), the energy stored in the transformer 302 is transferred to the secondary-winding 312 which produces the secondary-winding current $I_{SEC}$ that exits the secondary-winding 312. The SR controller 116 turns on the SR transistor (i.e., setting to an ON-state) by charging a gate of the SR transistor with a second gate bias voltage. When in the ON-state, the secondary-winding current $I_{SEC}$ flows through the SR transistor to charge (or re-charge) the output capacitor $C_{Out}$ with the output voltage.

In a continuous current mode (CCM) of operation, the PS transistor turns on before the SR transistor turns off causing the primary-winding current $I_{PRI}$ to increase with a very high slew rate as compared to the slower slew rate of the primary-winding current $I_{PRI}$ when the SR transistor is in an OFF-state. Additionally, the secondary-winding current $I_{SEC}$ decreases with a very high slew rate when both the PS transistor and SR transistor are in the ON-state as compared to the slower slew rate of the secondary-winding current $I_{SEC}$ when the PS transistor is in the OFF-state. The large slew rate of the secondary-winding current $I_{SEC}$ causes a voltage spike across the output capacitor $C_{Out}$ because of its ESL. The spike detector is configured to detect this voltage spike and, in response, turn off the SR transistor.

In this example, the spike detector 318 may be implemented as device, module, or circuit including a threshold detector (not shown) that is configured to compare a voltage proportional to the $V_{Out}$ against a first threshold where the spike detector 318 is configured to detect the voltage spike if the proportional voltage of the $V_{Out}$ is greater than the first threshold. The spike detector 318 may further include a time blanking circuit (not shown) that is configured to apply a blanking time at the beginning of a turn-on of the SR transistor to avoid a mis-triggering of the spike detector 318. The spike detector may also be configured to determine the voltage spike of the output voltage $V_{Out}$ when the PS transistor is turned-on while the SR transistor is also turned-on.

Figure 2A:
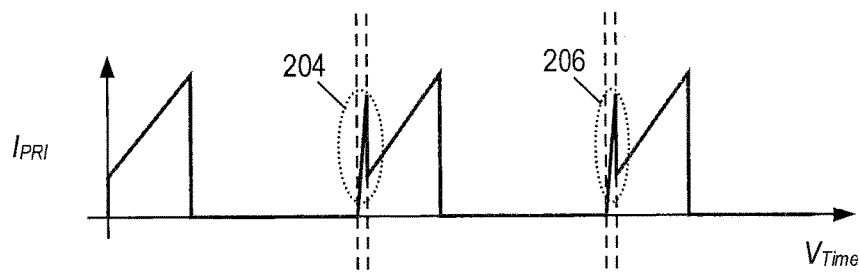
FIG. 2A-2E are signal waveforms produced by the flyback converter shown in FIG. 1 in an example of operation.
Figure 2B:
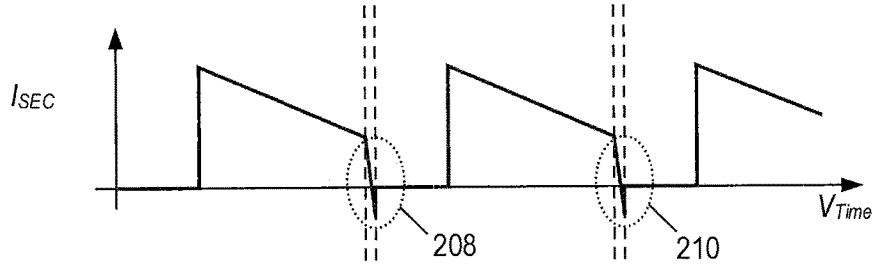
Figure 2C:
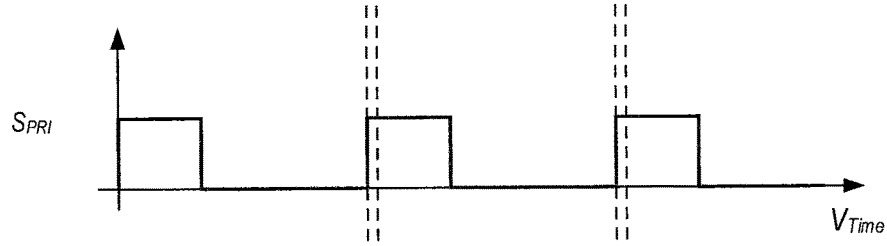
Figure 2D:
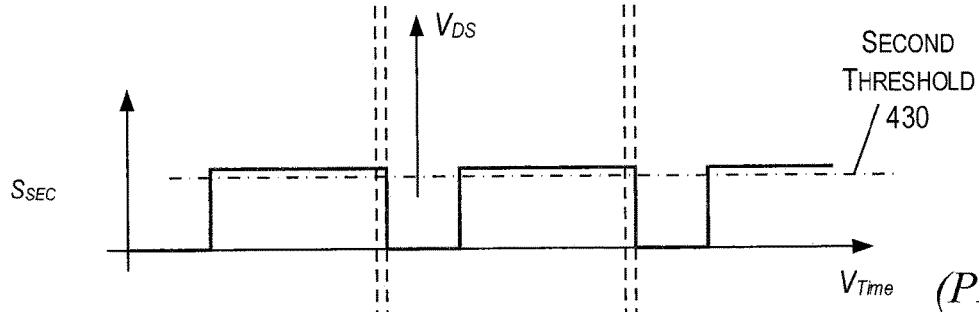
Figure 2E:
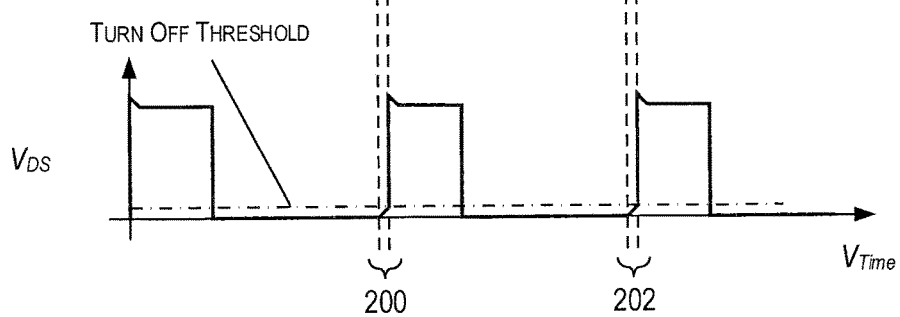

In addition, the SR controller 316 may include a second threshold detector that is configured to compare the $V_{DS}$ of the SR transistor against a second threshold voltage (the turn-off threshold of FIG. 2E), where the SR controller 316 is configured turn-off the SR transistor based on the spike detector detecting that the voltage spike of the $V_{Out}$ or in response to the $V_{DS}$ of the SR being greater than the second threshold voltage. In this example, the second threshold voltage may be determined by an equivalent resistance ($R_{dson}$) of the SR transistor multiplied by a secondary current (i.e., $I_{SEC}$) of the secondary-side 306 produced when the PS is turned-on while the SR transistor is also turned-on.

Figure 3B:
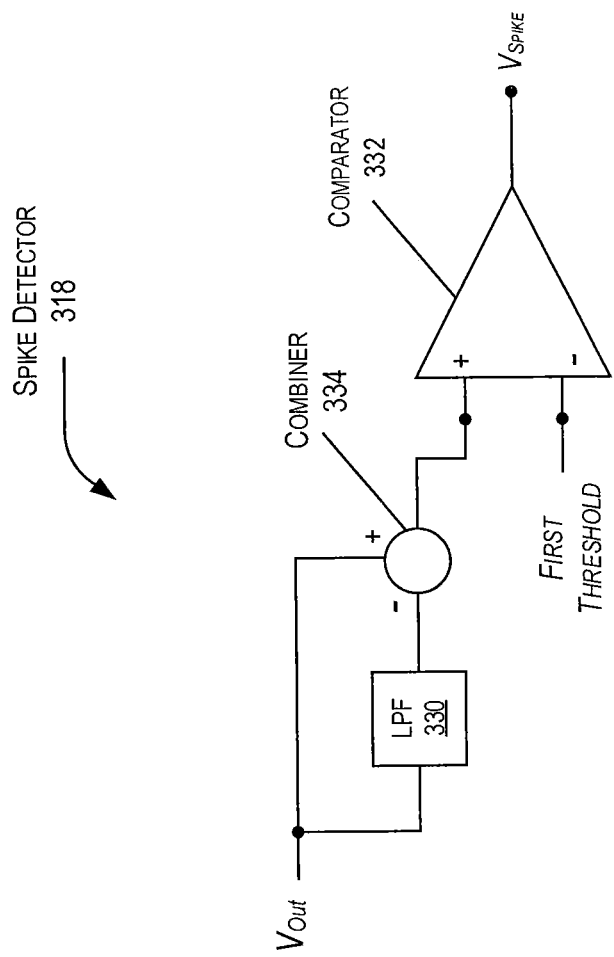
FIG. 3B is a circuit diagram of the spike detector of FIG. 3A in accordance with an aspect of the disclosure.

In FIG. 3B, a circuit diagram of an example spike detector 318 is shown in accordance with an aspect of the disclosure. The spike detector 318 may include a low-pass filter (LPF) 330, a comparator 332 acting as a threshold detector, and a combiner 334. In this example, the combiner 334 may be, for example, a differential amplifier. In this example, the combiner 334 has a negative input terminal (−) that is in signal communication with low-pass filter 330 and has a positive input terminal (+) that is signal communication with a node for the output voltage. The combiner thus outputs a difference voltage that equals a difference between the output voltage and a low-pass-filtered version of the output voltage. The comparator 332 compares the difference voltage from the combiner 334 to the first threshold voltage. Should the difference voltage exceed the first threshold voltage, a voltage spike is deemed to have been detected such that comparator 332 asserts its output signal.

In an example of operation, the spike detector 318 receives the output voltage $V_{Out}$, low-pass filters it with the low-pass filter 330. The combiner 334 subtracts the low-pass-filtered version of the output voltage from the output voltage to produce the difference voltage. The comparator 332 then compares this output signal from the combiner 334 to the first threshold voltage to produce a $V_{SPIKE}$ output.

Turning to FIGS. 4A-4E, plots of the operating waveforms of the $I_{PRI}$, $I_{SEC}$, on-state of the PS transistor ($S_{PRI}$), on-state of the SR transistor ($S_{SEC}$), and output voltage $V_{Out}$ produced by the flyback converter 300 are shown over several switching cycles in accordance with the present disclosure. In these plots, it is seen that during a first simultaneous on-time 400 and a second simultaneous on-time 402 of the SR and PS transistors (i.e., the times when both the $S_{PRI}$ and $S_{SEC}$ are in ON-time state), the $I_{PRI}$ increases quickly at very high slew rate 404 and 406 and $I_{SEC}$ decreases quickly also at a very high slew rate 408 and 410 as compared to the slower slew rates of $I_{PRI}$ and $I_{SEC}$, respectively, when the PS transistor and SR transistor are not simultaneously on.

When this high slew rate 408 and 410 of the $I_{SEC}$ reaches the $C_{out}$, the ESL of the output capacitor will produce a relatively high voltage spike in the output voltage (note that this voltage spike may be either positive or negative depending upon the implementation). In particular, the output voltage has a voltage spike 422 during simultaneous on-time 400 and a voltage spike 424 during simultaneous on-time 402. These voltage spikes cross the first threshold 428 with respect to a low-pass-filtered level 426 of the output voltage.

As an example, the slew rate of the $I_{SEC}$ flowing into the SR transistor during the simultaneous on-time can be determined approximately as below, assuming the SR transistor and PS transistor have zero voltage drop when they are on. For example, when the SR transistor is on the slew rate of the $I_{SEC}$ is defined as:

$$\frac{dI_{SEC}}{dt} = \frac{V_{Out}}{\frac{L_m}{N^2}}.$$

When both PS and SR are fully on, the slew rate for $I_{SEC}$ is defined as:

$$\frac{dI_{SEC}}{dt} \approx \frac{V_{Out} + \frac{V_{In}}{N^2}}{\frac{L_{lk-p}}{N^2} + L_{lk-s}}.$$

Since the leakage inductances are relatively small as compared to the magnetizing inductance, the slew rate for the secondary-winding current is relatively large during the simultaneous on-time.

The spike detector 318 is configured to detect the voltage spikes 422 and 424 of the output voltage $V_{Out}$ so that SR controller 316 may turn-off the SR transistor based on the spike detector 318 detecting the voltage spikes 422 and 424. The spike detector 318 may also include a time blanking circuit that is configured to apply a blanking time at the beginning of a turn-on of the SR transistor to avoid a mis-trigger of the spike detector 318.

Figure 4A:
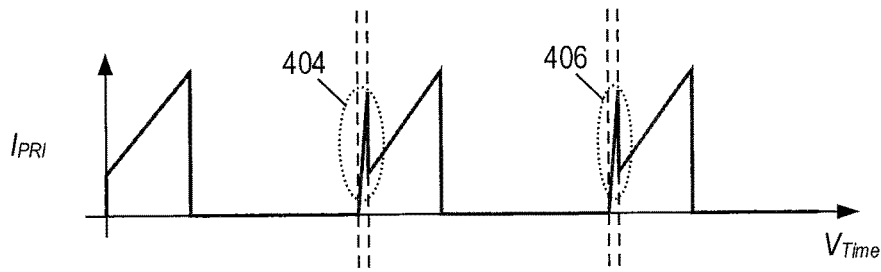
FIG. 4A-4F are signal waveforms produced by the flyback converter shown in FIG. 3A in an example of operation in accordance with the present disclosure.
Figure 4B:
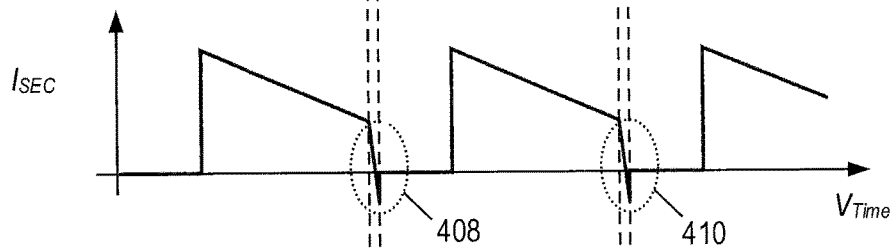
Figure 4C:
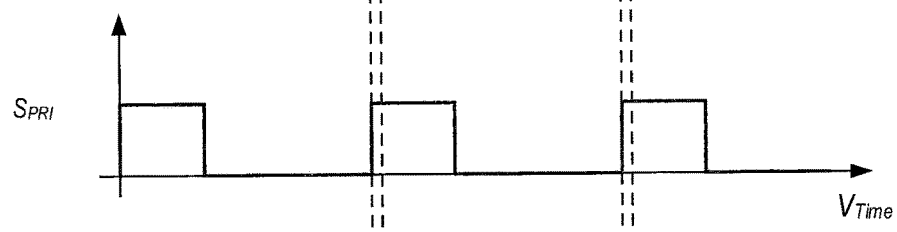
Figure 4D:
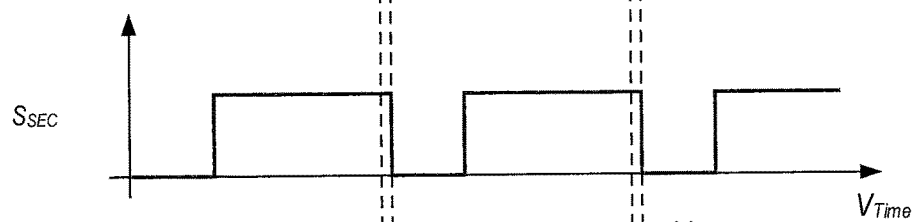
Figure 4E:
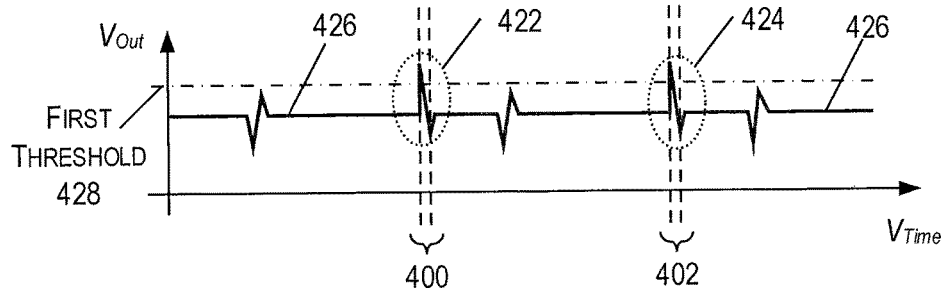
Figure 4F:
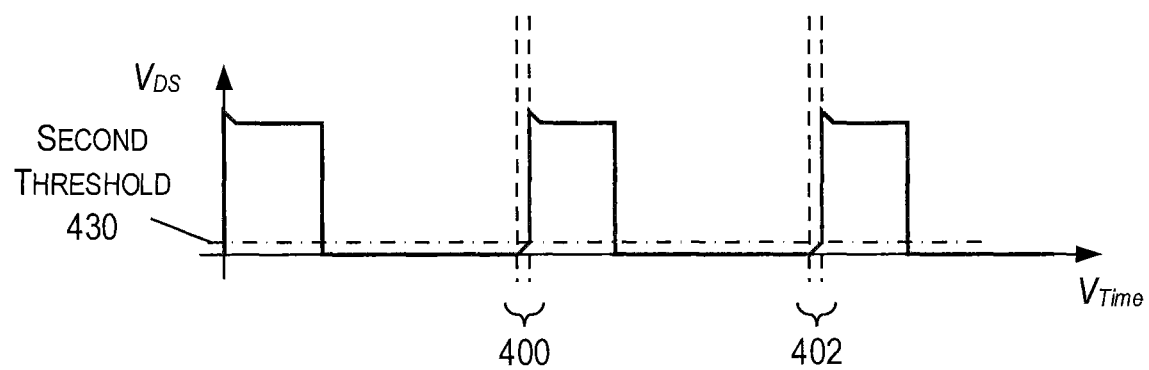

In this example, the SR controller 316 may also utilize the $V_{DS}$ of the SR transistor to detect that the PS is turned on (such as during discontinuous conduction mode). In general, during the SR transistor turn-on, the SR transistor is equivalent to a resistor ($R_{dson}$) in series with a very small parasitic inductance. The $V_{DS}$ is mainly determined by the current going into SR transistor multiplied by the $R_{dson}$ (i.e., $V_{DS}=I_{SEC}\times R_{dson}$). In this example, in order to avoid the switching noises and offset so that a more accurate sensing can be achieved, the parasitic inductance in the sensing path may be minimized. The SR controller 316 may thus include a second threshold detector that is configured to compare the $V_{DS}$ of the SR transistor against the second threshold 430 (off-threshold) of FIG. 4F. In this example, the SR controller is configured to detect if the $V_{DS}$ of the SR transistor is greater than the second threshold 430, and turn-off the SR transistor based on either the spike detector 318 detecting that the voltage spike 422 with respect to first threshold 428 or 424 or from the $V_{DS}$ of the SR transistor being greater than the second threshold 430.

It is appreciated that while voltage spikes 422 and 424 are shown as positive voltage values, the voltage spikes 422 and 424 may alternatively be negative voltage values having a voltage spike minimum value. A ZVS embodiment will now be discussed.

Figure 5:
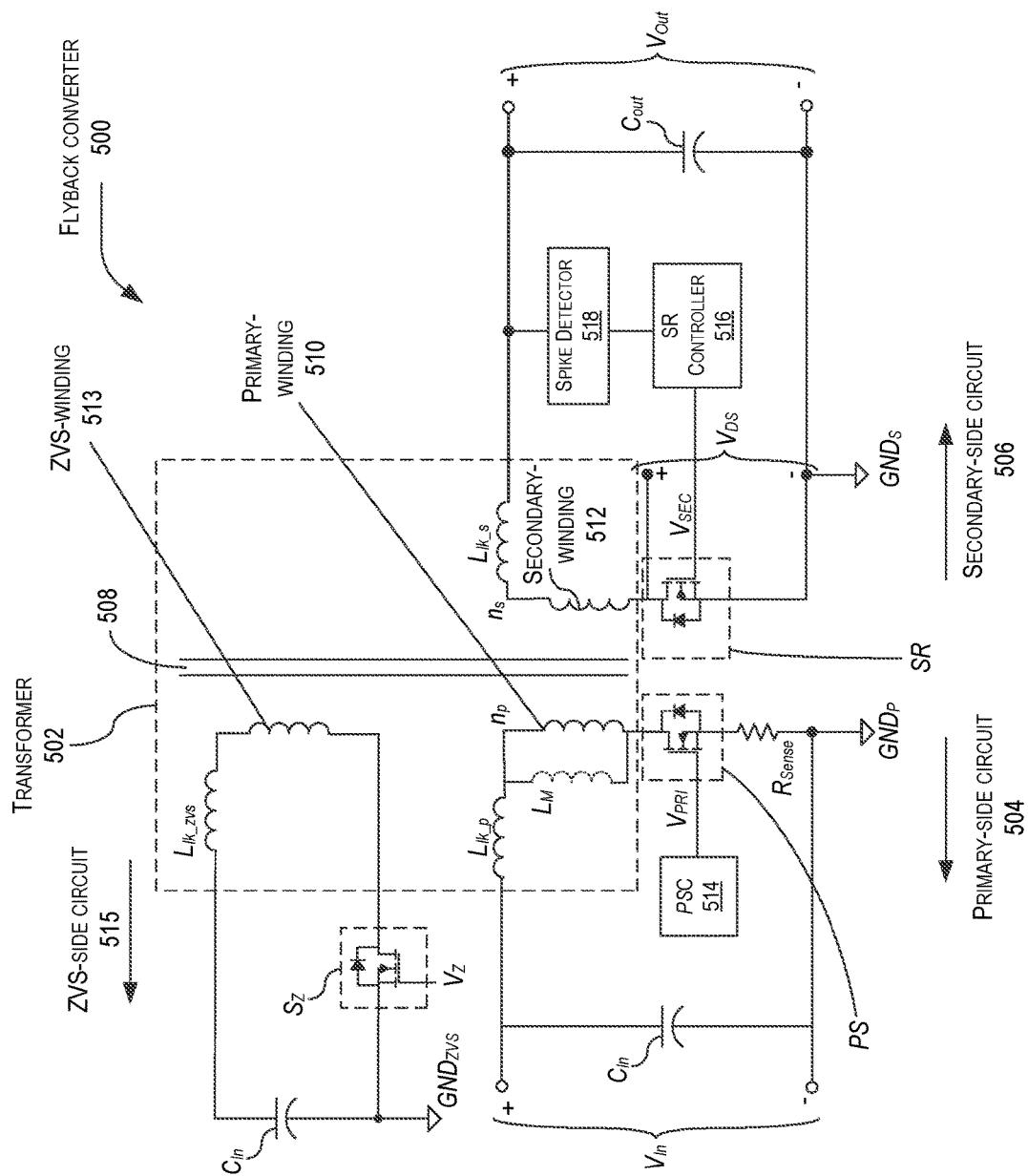
FIG. 5 is a schematic system diagram of another example of an implementation of a flyback converter in accordance with the present disclosure.
Figure 6A:
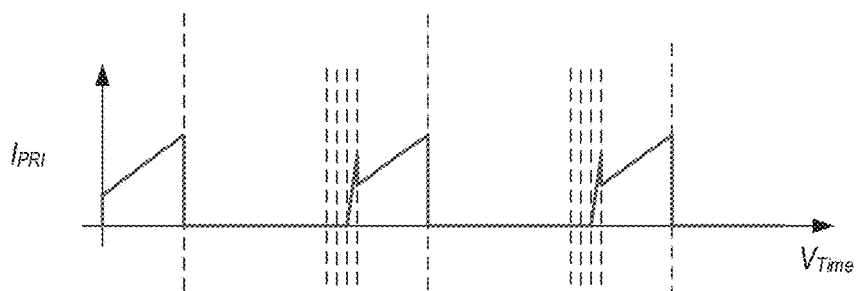
FIG. 6A-6F are signal waveforms produced by the flyback converter shown in FIG. 5 in an example of operation in accordance with the present disclosure.
Figure 6B:
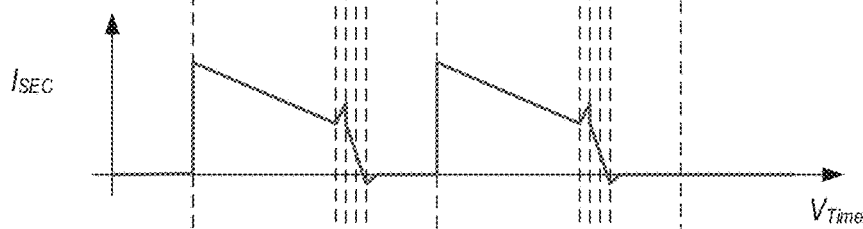
Figure 6C:
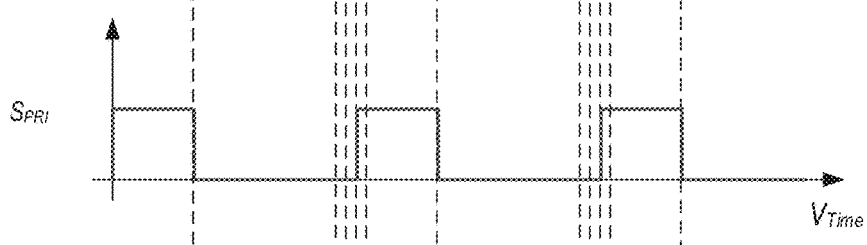
Figure 6D:
Figure 6E:
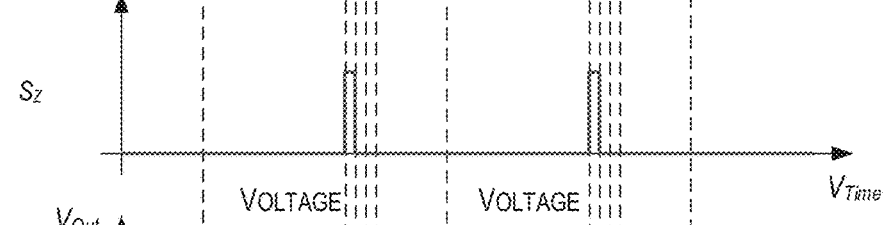
Figure 6F:
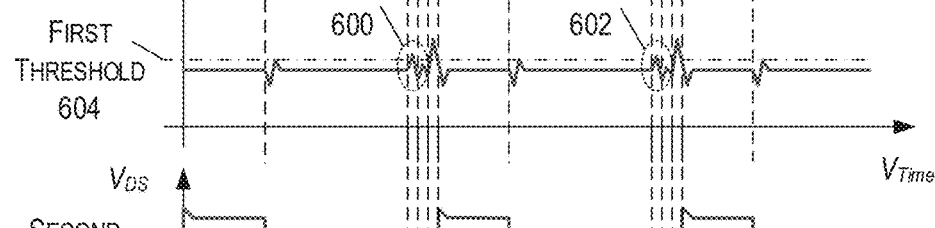

In FIG. 5, a schematic system diagram of an example flyback converter 500 with zero-voltage switching (ZVS). The flyback converter 500 is analogous to the flyback HAYNES AND BOONE, LIT converter 300 in that flyback converter 500 includes a transformer 502 that divides the COSTA MESA CA 92626 flyback converter 500 into a primary-side circuit 504, secondary-side circuit 506. Flyback converter 500 also includes a zero-voltage switching side (ZVS-side) circuit 515.

Similar to the example described in relation to the flyback converter 300, the transformer 502 also includes a transformer core 508 and primary-winding 510 and secondary-winding 512, where the primary-winding 510 is in signal communication with the primary-side circuit 504 and the secondary-winding 512 is in signal communication with the secondary-side circuit 506. In this example, the transformer 502 is modeled as including the transformer core 508, the primary-winding 510, secondary-winding 512, the magnetizing inductance ($L_M$), the primary-side leakage inductance ($L_{lk-p}$), the secondary-side leakage inductance ($L_{lk-s}$), an auxiliary winding that may also be denoted as a ZVS-winding 513, and a ZVS leakage inductance ($L_{lk-ZVS}$).

Similar to the flyback converter 300, the primary-side circuit 504 includes the PS transistor, the PSC 514, the input capacitor ($C_{In}$), and the sensing resistor ($R_{Sense}$) between the source of the PS transistor and a primary-side ground ($GND_P$). The secondary-side circuit 506 includes the synchronous rectifier (SR) transistor, the output capacitor ($C_{Out}$), the SR controller (SRC) 516, and the spike detector 518. The SR controller 516 is in signal communication with the gate of the SR transistor and the spike detector 518. The spike detector 518 is also in signal communication with the output capacitor $C_{Out}$ and the secondary-winding 512. In this example the output capacitor $C_{Out}$ has a relatively large built-in equivalent series inductance (ESL).

The ZVS-side circuit 515 includes a second primary switch (that may be, for example, an active-clamp transistor), which may also be denoted as a ZVS transistor $S_Z$), the ZVS-winding 513, $L_{lk-ZVS}$, and an active-clamp capacitor that may also be denoted as a ZVS capacitor ($C_{ZVS}$). The primary-winding 510, secondary-winding 512, and auxiliary-winding 513 are all coupled to the transformer core 508.

In an example of operation of the flyback converter 500, the primary-winding 510 conducts primary-winding current ($I_{PRI}$) when the PS transistor is in an ON-state and the secondary-winding 512 conducts a secondary-winding current ($I_{SEC}$) when the SR transistor is in an ON-state. The flyback converter 500 utilizes a method that completely avoids the simultaneous on-time of PS and RS switches in either a ZVS or active-clamp flyback configuration, thus improving the efficiency and reliability of the flyback converter 500.

Specifically, in this example, the active-clamp transistor (i.e., $S_Z$) is turned on shortly before the PS transistor turns on. In general, this event cannot be detected by the traditional $V_{DS}$ sensing technique but can be detected by sensing the $V_{Out}$ for voltage spikes as was described earlier in relation to FIG. 3. In this example, the secondary-side circuit 506 utilizes the same voltage spike detection method described earlier.

Turning to FIGS. 6A-6F, plots of the operating waveforms of the $I_{PRI}$, $I_{SEC}$, on-state of the PS transistor (SERA on-state of the SR transistor ($S_{SEC}$), on-state of the active-clamp transistor ($S_Z$), and output voltage $V_{Out}$ produced by the flyback converter 500 over several switching cycles are shown in accordance with the present disclosure. In this example, the $S_Z$ is turned on for a very short period right before the PS transistor is switched on. During the $S_Z$ on-time, the $V_{DS}$ of the SR transistor does not touch the turn-off second threshold 606. However, the output voltage $V_{Out}$ has a voltage spike 600 for a first active-clamp transistor on-time and a voltage spike 602 for a second active-clamp transistor on-time. Detecting the voltage spikes 600 and 602 as compared to the first threshold 604 may thus advantageously allow the SR controller to switch-off the SR transistor before the PS transistor is switched on.

Figure 7:
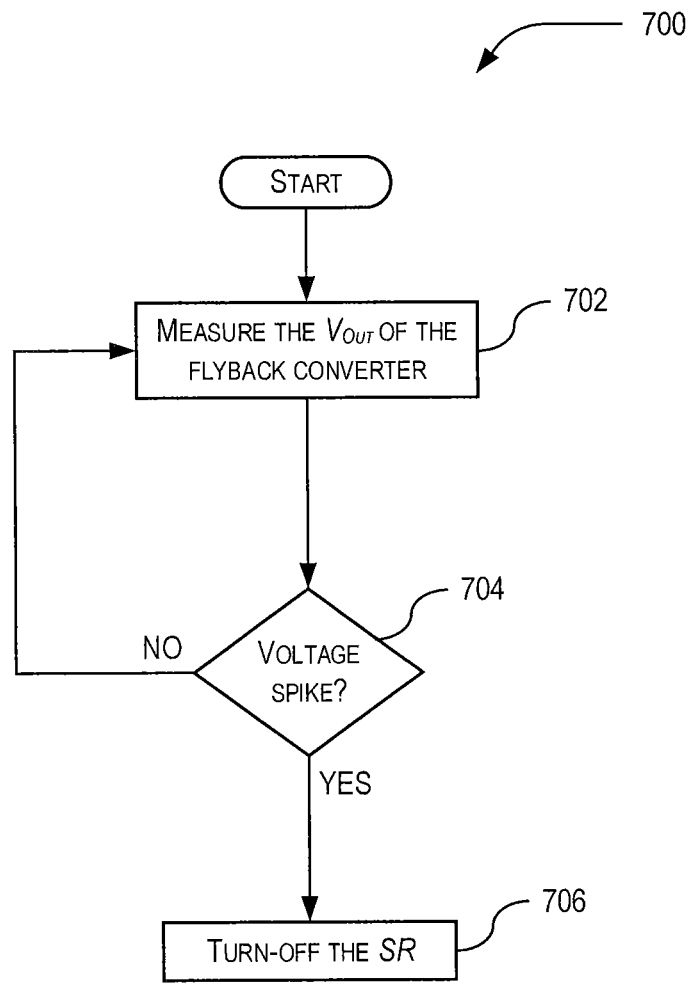
FIG. 7 is a flowchart illustrating an example of an implementation of a method performed by the flyback converter shown in FIG. 3 in accordance with the present disclosure.

FIG. 7 is a flowchart illustrating an example of an implementation of a method 700 performed by the flyback converter 300 in accordance with the present disclosure. The method 700 is utilized for turning off a SR transistor based on a PS transistor turn-on detection in the flyback converter 300. The method 700 comprises measuring 702 the output voltage ($V_{Out}$) across an output capacitor ($C_{out}$) on the secondary-side of the flyback converter 300 and detecting 704 (i.e. determining), with the spike detector 318, a voltage spike of the $V_{Out}$ that is indicative of the PS being turned-on. If there is no detected voltage spike, the method 700 returns to step 702 and again measures 702 the $V_{Out}$ across the $C_{out}$ looking for a possible voltage spike. If, instead, a voltage spike is detected, the method 700 turns off 706 the SR when the voltage spike of the $V_{Out}$ is detected with the spike detector 318.

Figure 8:
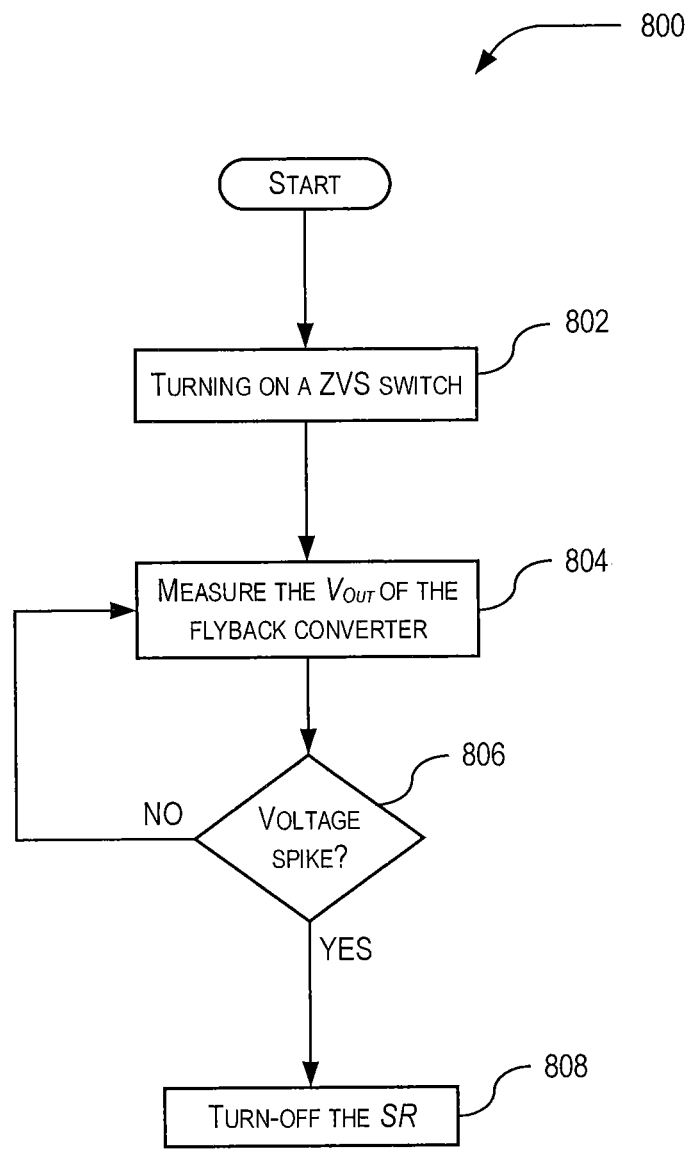
FIG. 8 is a flowchart illustrating an example of an implementation of a method performed by the flyback converter shown in FIG. 5 in accordance with the present disclosure.

Turning to FIG. 8, a flowchart illustrating an example of another implementation of a method 800 performed by the flyback converter 500 in accordance with the present disclosure. The method 800 is utilized for turning off the SR based on the PS turn-on detection in the flyback converter 500. The method 800 comprises initially turning on 802 the ZVS switch (i.e., $S_Z$) to produce a small voltage spike on the $V_{Out}$. In this example, the $S_Z$ is turned on prior to the PS turn-on. The method 800 then measures 804 the $V_{Out}$ across the $C_{out}$ on the secondary-side of the flyback converter 500 and detecting 806 (i.e. determining), with the spike detector 518, a voltage spike of the $V_{Out}$ that is indicative of the PS being turned-on. If there is no detected voltage spike, the method 800 returns to step 804 and again measures 804 the $V_{Out}$ across the $C_{out}$ looking for a possible voltage spike. If, instead, a voltage spike is detected, the method 800 turns off 808 the SR when the voltage spike of the $V_{Out}$ is detected with the spike detector 518.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

What is claimed:

1. A system for turning-off a synchronous rectifier (SR) transistor based on a power switch (PS) transistor turn-on detection in a flyback converter, the system comprising:
   a spike detector having a terminal coupled to an output capacitor in series with a secondary winding for the flyback converter, the spike detector being configured to detect an increase of an output voltage across the output capacitor; and
   an SR controller in signal communication with the SR transistor and with the spike detector, wherein the SR controller is configured to turn-off the SR transistor based on the spike detector detecting the increase of the output voltage.

2. The system of claim 1,
   wherein the spike detector includes a low-pass filter, a combiner, and a comparator, wherein
   the low-pass filter is configured to low-pass filter the output voltage to produce a filtered output voltage,
   the combiner is configured to subtract the filtered output voltage from the output voltage to produce a difference voltage, and
   the comparator is configured to compare the difference voltage to detect if the difference voltage is greater than a first threshold to detect the increase of the output voltage.

3. The system of claim 2,
   wherein the SR controller includes a second threshold detector that is configured to compare a drain-to-source voltage ($V_{DS}$) of the SR transistor against a second threshold, and
   wherein the SR controller is configured to
      detect if the $V_{DS}$ is greater than the second threshold, and
      turn-off the SR transistor based on the $V_{DS}$ of the SR transistor being greater than the second threshold.

4. The system of claim 3, wherein the second threshold is determined by an equivalent resistance ($R_{dson}$) of the SR transistor multiplied by a secondary-winding current ($I_{SEC}$).

5. The system of claim 1, wherein the SR controller is configured to turn-off the SR switch prior to the PS switch being turned-on.

6. The system of claim 1, wherein the spike detector is configured to detect the increase of the output voltage when the PS transistor is turned-on while the SR transistor is also turned-on.

7. A method for turning off a synchronous rectifier (SR) based on a power switch (PS) transistor turn-on detection in a flyback converter, the method comprising:
   detecting, with a spike detector having a terminal coupled to output capacitor in series with a secondary winding, an increase of an output voltage across the output capacitor in series with a secondary winding; and
   turning-off the SR transistor in response to the spike detector detecting the increase of the output voltage.

8. The method of claim 7, wherein the detecting of the increase of the output voltage includes
   low-pass filtering the output voltage to produce a filtered $V_{Out}$,
   subtracting the filtered $V_{Out}$ from the output voltage to produce a difference voltage,
   comparing the difference voltage against a first threshold and
   detecting the increase of the output voltage if the difference voltage is greater than the first threshold.

9. The method of claim 8, further comprising applying a blanking time at the beginning of a turn-on of the SR transistor to avoid a mis-trigger of the spike detector.

10. The method of claim 9, wherein the SR transistor is turned-off prior to the PS transistor being turned-on.

11. The method of claim 8,
    comparing a drain-to-source voltage ($V_{DS}$) of the SR transistor against a second threshold,
    detecting if the $V_{DS}$ is greater than the second threshold, and
    turning-off the SR transistor based on detecting that the $V_{DS}$ is greater than the second threshold.

12. The method of claim 11, wherein the second threshold is determined by an equivalent resistance ($R_{dson}$) of the SR transistor multiplied by a secondary-winding current ($I_{SEC}$).

13. The method of claim 7, wherein the increase of the output voltage is detected during a simultaneous on-time of the PS transistor and the SR transistor.

14. A system for turning off a synchronous rectifier (SR) transistor based on a power switch (PS) transistor turn-on detection in a flyback converter, the system comprising:
    a spike detector including a terminal coupled to an output capacitor in series with a secondary winding of the flyback converter, wherein the spike detector is configured to detect an increase of an output voltage ($V_{Out}$) across the output capacitor when a second primary switch transistor for the flyback converter is turned-on; and
    an SR controller in signal communication with the SR transistor and with the spike detector, wherein the SR controller is configured to turn-off the SR transistor based on the spike detector detecting the increase of the output voltage.

15. The system of claim 14, wherein the spike detector is configured to detect the increase of the output voltage during a simultaneous on-time of the second primary switch transistor and the SR transistor.

16. The system of claim 14, wherein the spike detector includes a low-pass filter, a combiner, and a comparator, wherein
    the spike detector includes a low-pass filter, a combiner, and a comparator, wherein:
    the low-pass filter is configured to low-pass filter the output voltage to produce a filtered output voltage,
    the combiner is configured to subtract the filtered output voltage from the output voltage to produce a difference voltage, and
    the comparator is configured to compare the difference voltage to detect if the difference voltage is greater than the first threshold to detect the increase of the output voltage.

17. The system of claim 14, wherein the spike detector is further configured to detect the increase of the output voltage during a continuous conduction mode of operation for the flyback converter.

* * * * *

UNITED STATES PATENT AND TRADEMARK OFFICE
CERTIFICATE OF CORRECTION

PATENT NO. : 11,601,061 B2  
APPLICATION NO. : 16/784108  
DATED : March 7, 2023  
INVENTOR(S) : Pengju Kong and Qingqing Zong Page 1 of 1

It is certified that error appears in the above-identified patent and that said Letters Patent is hereby corrected as shown below:

In the Specification

Column 8, Lines 32, change "HAYNES AND BOONE, LIT converter 300" to --converter 300--.

Column 8, Lines 34, change "COSTA MESA CA 92626 flyback converter 500" to --flyback converter 500--.

Column 9, Line 23, change "PS transistor (SERA on-state" to --PS transistor ($S_{PRI}$), on state--

Signed and Sealed this  
Fifteenth Day of October, 2024

Katherine Kelly Vidal  
*Director of the United States Patent and Trademark Office*